No Printed Specification Available
5806X
A. Bull,
Rope Machine.
No.
Patented Jan. 30, 1830.
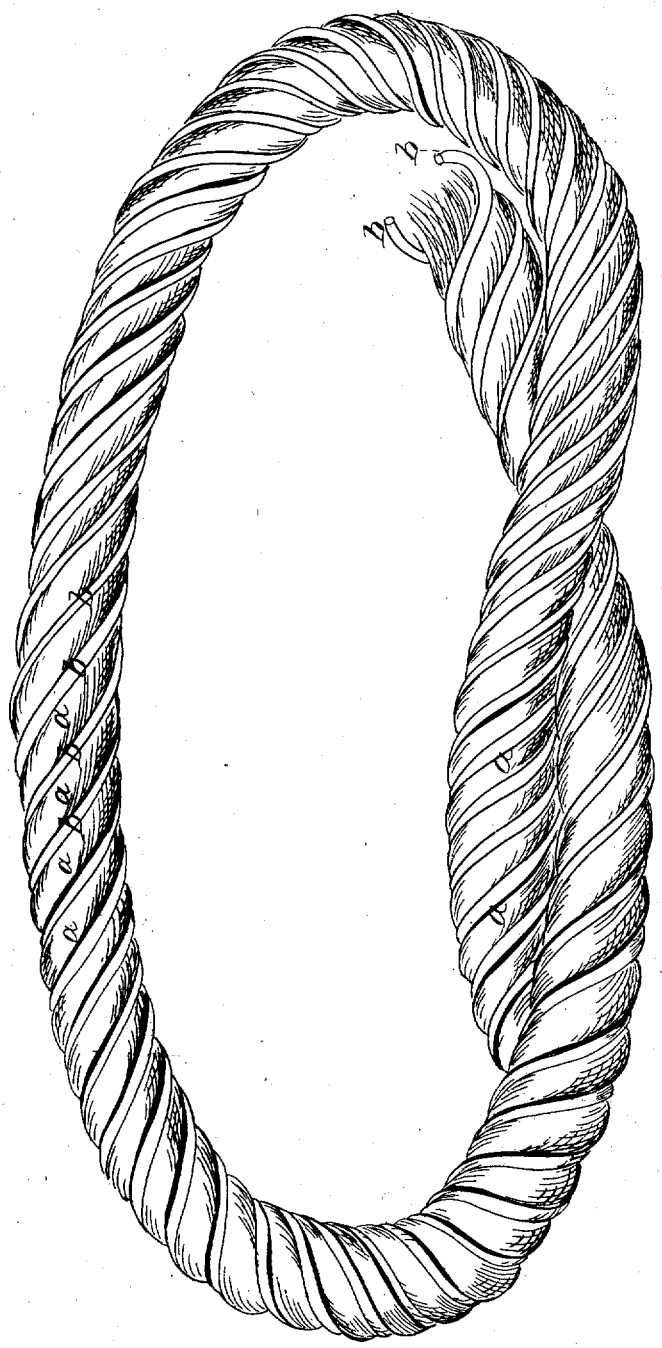
N. PETERS, PHOTO-LITHOGRAPHER, WASHINGTON, D. C.

X5806 Jan 30 1830 149

Aaron Bull. of Carlisle State of New York.

Letters Patent.

The schedule referred to in these Letters Patent and making part of the same containing a description in the words of the said Aaron Bull himself of his improvement in making Tow-line for towing Boats on canals & for other purposes —

Be it known that I Aaron Bull of Carlisle, county of Tompkins & State of New York, have made an improvement or discovery in making tow lines for towing boats on canals & for other purposes which is described as follows.—

Make the tow line of hemp or any other suitable material with two or more strands, plies, or thicknesses & in the usual way. Take brass, Copper or iron wire, with or without gilding or covering, & lay it between the strands, plies, or thicknesses of the tow lines on the surface, & so as to give strength & consistancy to the line, & prevent as much as possible all friction & wear Invention Claimed, What I claim as my invention or discovery is the application of any metalic wire in making tow lines, for canal boats, & for other purposes, —

For a further illustration of my invention or discovery I refer to the Specimen of my tow-line & the drawing of the same, deposited in the Patent office of the United States In witness whereof I have subscribed my name at the City of Washington this 5th day of January 1830 —

Witnesses
William P. Elliot
Robert W. Fenwick

Aaron Bull.